Patented Jan. 8, 1952

2,581,484

UNITED STATES PATENT OFFICE 2,581,484

PROCESS IN PRETREATING VEGETABLES AND FRUITS BEFORE FREEZING

Oyvind Helgerud, Oslo, Norway

No Drawing. Application August 7, 1947, Serial No. 767,328. In Norway August 24, 1946

1 Claim. (Cl. 99—154)

In freezing vegetables, fruits and the like it is often necessary to subject the products to be frozen to a special treatment before freezing, in which one of the most important steps consists in blanching the goods in order to destroy injurious enzymes. This blanching process usually takes place in water or steam of about 100° C., whereafter the goods should be cooled as quickly as possible. The cooling usually is effected either in a cold air blast or in running water. However, in the cooling methods used up to the present time it has been found that the presence of air at the higher temperature brings about an oxidation and other detrimental effects which reduces the quality of the product. In the often used sprinkling with water also a perceptible reduction of the vitamin C contents of the goods takes place, while the goods thereby also will take up undesired high contents of water in the subsequent freezing process.

The present invention provides for preventing these drawbacks and is distinguished by the goods, after being treated with water or steam of about 100° C. are cooled without access of air and under vacuum, this being attained by the water in evaporating from the surface of the goods exerting a cooling and drying effect on same. The vacuum is created automatically by effecting a condensation of the water vapour in the receptacle, which is attained by arranging a preferably water cooled cooling device in the receptacle or connected with same, the device thereby condensing the evaporating water. As a safety measure a vacuum pump may also be provided for, which is used in case of minor defects in joints and flanges.

It being of particular importance that the water vapour used in heating the goods are practically air-free, it is preferable to collect the condensate from the receptacle formed during the cooling process and use it in a renewed heating operation.

I claim:

Process in pretreating vegetables and fruits before freezing, comprising in subjecting the vegetables to the action of water or steam of about 100° C. in a confined space thereby expelling the air from the confined space, and thereafter cooling the vegetable products in a vacuum, said vacuum being produced in the confined space solely by a condensation of the water vapor which is present in the confined space and by the water evaporated from the surface of the vegetable products which during evaporation cools down the vegetable products without access of air.

OYVIND HELGERUD.

REFERENCES CITED

The following references are of record in the file of this patent:

UNITED STATES PATENTS

| Number | Name | Date |
|---|---|---|
| 126,148 | Lyman | Apr. 30, 1872 |
| 1,138,888 | Plunkett | May 11, 1915 |
| 1,421,750 | Willison | July 4, 1922 |
| 1,685,511 | Thomas | Sept. 25, 1928 |
| 1,910,749 | Chapman | May 23, 1933 |
| 1,973,634 | Lang | Sept. 11, 1934 |
| 1,975,009 | Kronquest | Sept. 25, 1934 |
| 2,080,179 | Merriam et al. | May 11, 1937 |
| 2,184,275 | Baer | Dec. 26, 1939 |
| 2,292,447 | Irwin, Jr. | Aug. 11, 1942 |
| 2,369,765 | Waters | Feb. 20, 1945 |
| 2,373,521 | Wigelsworth | Apr. 10, 1945 |
| 2,402,672 | Schaffner | June 25, 1946 |
| 2,402,679 | Schaffner | June 25, 1946 |
| 2,403,871 | McBean | July 9, 1946 |
| 2,429,785 | Winters | Oct. 28, 1947 |
| 2,515,025 | Vahl et al. | July 11, 1950 |